June 21, 1938.  T. J. SCOFIELD  2,121,266
WINDSHIELD CLEANER
Filed Feb. 1, 1937
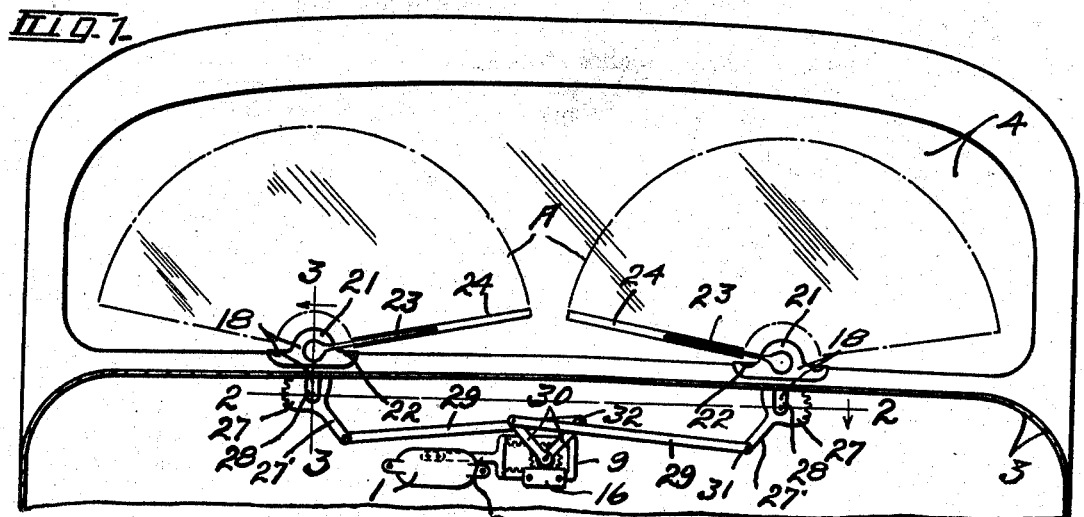
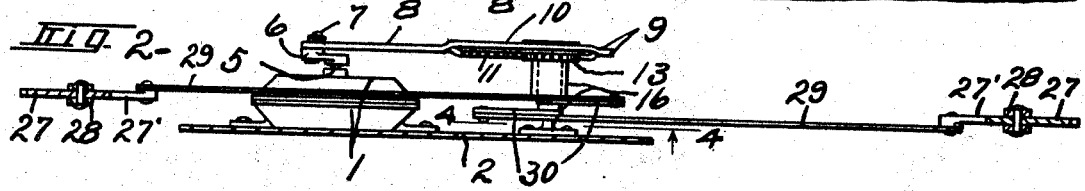
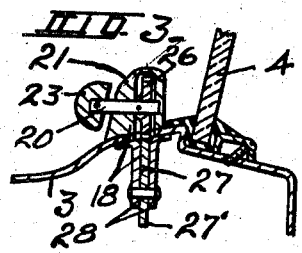
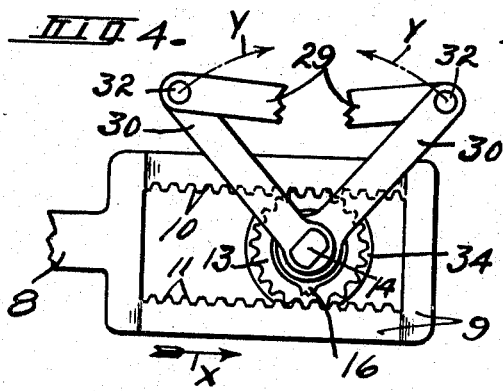
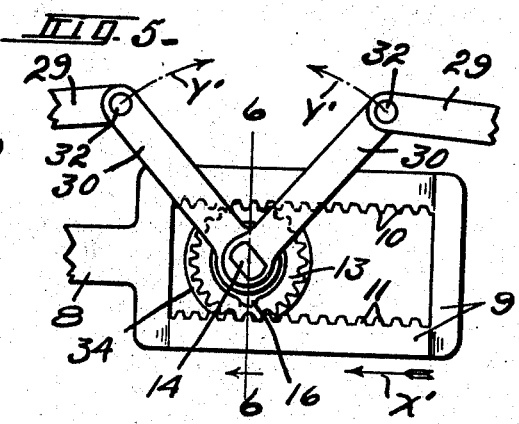
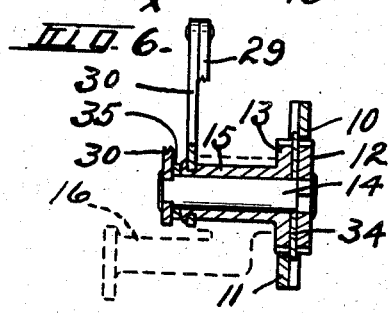
INVENTOR
T. J. Scofield
BY
Theodore Simonton
ATTORNEY Patented June 21, 1938

2,121,266

UNITED STATES PATENT OFFICE 2,121,266

WINDSHIELD CLEANER

Theodore J. Scofield, Jackson, Mich., assignor to The Sparks-Withington Company, Jackson, Mich., a corporation of Ohio Application February 1, 1937, Serial No. 123,341

2 Claims. (Cl. 74—78)

This invention relates to improvements in windshield cleaners in which a pair of wiper elements are oscillated back and forth in contact with a surface of the windshield by a common motor.

The main objects of this invention are to provide a transmission apparatus for operatively connecting the drive shaft of a windshield cleaner motor with a pair of wiper operating units mounted in positions remote from the motor which is simple, economical and durable in construction and which is applicable to modern windshields of various types and designs.

A more specific object of the invention is to provide a transmission mechanism for operatively connecting a pair of wiper units with a common cleaner motor whether of the electric, fluid pressure, or mechanical type, and wherein the drive shaft of the motor is rotated either continuously in one direction or alternately, first in one direction and then in the reverse direction.

Another object of the invention resides in providing a transmission linkage of the above mentioned class whereby the motor may be quickly and easily detached from the linkage mechanism to permit cleaning, oiling or the replacement of parts of the motor.

A further object is to provide a windshield cleaner apparatus embodying two cleaner units with a transmission mechanism for connecting said units with a common motor whereby the cleaner elements of the units will be moved simultaneously toward or from each other and when in the parked position both elements will be maintained out of the line of vision.

Other objects and advantages pertaining to the structure of my device and to the relation of the parts thereof will more fully appear from the following description taken in conjunction with the accompanying drawing, in which:

Figure 1 is a detail transverse sectional view of an automobile body illustrating the windshield in front elevation and a windshield cleaner embodying the various features of this invention operatively connected therewith.

Figure 2 is a detail horizontal sectional view taken substantially in the plane of the line 2—2, Figure 1, illustrating the greater portion of the windshield cleaner mechanism shown in Figure 1 in top plan.

Figure 3 is a detail vertical sectional view taken on line 3—3, Figure 1.

Figure 4 is a detail side elevation of the rack frame and adjacent portions of the linkage and pinion mechanism associated therewith as viewed from line 4—4, Figure 2, and with a portion of the supporting bracket thereof broken away.

Figure 5 is a view, similar to Figure 4, illustrating the rack frame and linkage mechanism actuated thereby in a second position.

Figure 6 is a transverse sectional view taken on the line 6—6, Figure 5.

The windshield cleaner mechanism, as illustrated in the drawing, comprises a motor 1 of any suitable construction mounted upon a supporting bar or plate 2 secured to the inner face of the body 3 of a motor vehicle below the windshield 4. The motor 1 has the drive shaft 5 thereof provided with a crank arm 6 which is rotatably and releasably connected by a bolt 7 or its equivalent to the outer end of a drive bar 8 connected with a rectangular frame 9. This frame 9 is provided with a pair of rack members or sets of rack teeth 10 and 11 which extend longitudinally thereof and which are arranged one at either side of the frame in parallel relation with each other. The rack members 10 and 11 are arranged in different planes for meshing engagement with a respective pinion 12 and 13. The pinion 12, as shown more particularly in Figure 5, is secured to one end of a pinion shaft 14 which is rotatably mounted within a hollow shaft 15 connected with the other pinion 13. The shaft 15 is journaled in a bracket 16 which, as shown in Figure 2, is connected with the plate 2 to be supported thereby at one side of the motor 1.

Two wiper operating units 18 are secured to the body 3, one at either side of the motor 1 and frame 9, as shown in Figures 1 and 2. Each of these units 18 comprises a shaft 20 which is journaled in a housing 21 secured by screws 22 or the like to the body 3 adjacent the windshield 4 at the lower side of said windshield. One end of each shaft 20 extends to the outside of housing 21 and has secured thereto, in any suitable manner, a wiper arm 23 which carries a wiper blade 24. Secured to each shaft 20 and mounted within the corresponding housing 21 is a gear 26 which meshes with a segmental gear 27 rotatably supported by a bracket 28 secured, in any suitable manner as by the screws 22, to the body 3 of the vehicle beneath the housing 21, the body 3 being provided with a suitable slot beneath each housing 21 to permit the meshing of gears 26 and 27 (see Figure 3).

Each segmental gear 27 is provided with an arm 27'. Each of these arms is operatively connected with a respective one of the pinion shafts 14 and 15 by link 29 and crank arm 30. Each of the links 29 is provided with pivotal connections 31 and 32 for pivotally connecting the same with a respective arm 27' and crank arm 30. The crank arms 30 are fixedly secured to a respective shaft 14 and 15 to be actuated thereby. A guide disk 34 is mounted upon shaft 14 intermediate the pinions 12 and 13. This disk 34 is of slightly greater diameter than pinions 12 and 13 for engaging the adjacent inner faces of the racks 10 and 11, as shown in Figure 6, for maintaining the frame 9 against lateral displacement, whereby said racks will remain in meshing engagement with a respective pinion 12 and 13 during the reciprocating movement of the frame. A spacing washer 35 may, as shown in Figure 6, be mounted upon shaft 14 intermediate the outer end of shaft 15 and crank arm 30, connected with shaft 14 and which co-acts with the disk 34 and shaft 15 for maintaining the shaft 14 against axial displacement.

It will now be apparent that when motor 1 is operating, the drive crank arm 6 connected with the motor shaft 5 will produce reciprocation of frame 9 whether the arm 6 is driven continuously in one direction or is moved backward and forward with an oscillatory movement by the motor. The length of the arm between shaft 5 and pivot 7 will, of course, be such as to determine the length of the stroke of reciprocation of frame 9 in either case. Reciprocation of frame 9 produces oscillation of driven arms 30 in opposition to each other due to the engagement of rack 10 with pinions 12 at the opposite side of the axis of rotation of the pinion from that in which rack 11 engages pinion 13, that is, when frame 9 is moving from the position shown in Figure 4 toward the right as indicated by arrow X, arms 30 will swing in opposite directions as indicated by arrows Y through similar arcs, until they reach the position indicated in Figure 5 at the end of the first stroke of frame 9. This swinging movement of the arms 30 will move links 29 away from each other and produce a similar movement of crank arms 27' and the wiper arms 23 connected therewith by gears 26 and 27 to swing wiper blades 24 in directions away from each other.

Likewise, during the return stroke of frame 9, that is, when frame 9 is moved from the position shown in Figure 5 in the direction indicated by arrow X' to the position shown in Figure 4, the driven crank arms 30 will be rocked as indicated by arrows Y' through similar arcs in opposite directions to the initial positions thereof, shown in Figure 4. The links 29 are moved thereby toward each other which will, of course, produce a corresponding rocking movement of gears 27 and effect the return of wiper arms 23 and the wiper blades 24 carried by the latter arms to their respective initial positions.

It is thus seen that the wiper blades 24 are oscillated by power derived from motor 1 and applied through the transmission mechanism comprising racks 10, 11, pinions 12, 13, arms 30 and links 29 to said blades to clean corresponding areas of the windshield 4 indicated by broken lines A, Figure 1. During this cleaning operation the wiper blades 24 are moved in unison in opposed directions to provide for a maximum amount of vision and a minimum amount of confusion to the operator of the vehicle.

Although the construction and operation of my power transmission mechanism are particularly simple, practical and efficient, I do not wish to be limited to the exact construction shown as various changes may be made in the details thereof without departing from the spirit of the invention as set forth in the appended claims.

I claim:

1. A transmission mechanism for operatively connecting an actuating member to a pair of driven elements comprising a pair of shafts mounted in telescopic relation to rotate with respect to each other about a common axis, means including a pair of drive members mounted to reciprocate through definite strokes in a direction substantially normal to said axis for operatively connecting the shafts with the actuating member whereby said shafts will be simultaneously rocked in opposite directions, and means including a linkage mechanism for operatively connecting each of said shafts with a respective one of said driven elements.

2. In a transmission mechanism of the character described, a pair of oscillatory actuating shafts, a pair of crank arms connected with the respective shafts to oscillate therewith, a pair of drive gears, one gear for each shaft, oppositely disposed reciprocating rack members constantly meshing with the respective gears, and means for operatively connecting the crank arms with a respective element to be actuated thereby.

THEODORE J. SCOFIELD.